3,073,815
FILTRATION OF VISCOSE

Lionel Edison Dotson, Clinton, Iowa, assignor to E. I. du Pont de Nemours and Company, Wilmington, Del., a corporation of Delaware
No Drawing. Filed Feb. 25, 1959, Ser. No. 795,330
2 Claims. (Cl. 260—217)

This invention relates to the production of viscose, and more particularly to improvements in the step of filtering viscose.

In the manufacture of viscose for conversion to regenerated cellulose films, filaments, etc., it is necessary to filter the viscose prior to extrusion in order to remove any undissolved fibers, gel particles and foreign solid matter usually present in freshly prepared viscose. The usual method for many years has been to pass the viscose through such media as cotton cloths of various degrees of porosity to accomplish the desired filtration. Due to the chemical attack upon the filter cloths by the caustic viscose, it is necessary to discard these cloths upon becoming plugged. The plate and frame presses on which these cloths are used must then be cleaned and redressed. This results in excessive labor costs for cleaning and redressing the filter presses at frequent intervals and excessive material costs for the large amount of filter media used and discarded.

The principal object of this invention, therefore, is to provide for the expedient filtration of viscose which avoids the necessity for frequent material replacement and time and labor costs incident to the prior art method of filtration outlined above. A further object is to provide as the filtration medium an effective material which is resistant to the deteriorating action of alkali and which can be cleaned and revitalized when necessary. These and other objects will more clearly appear from the description which follows.

It has been unexpectedly discovered that a paper makers' felt for supporting and draining paper making material, such as is described and claimed in Gates, U.S. Patent No. 2,588,228, makes an excellent filtration medium for filtering viscose when the felt is made entirely with synthetic fibers which are alkali-resistant. Moreover, when the alkali-resistant felt becomes plugged, to an extent where it no longer performs satisfactorily, it can be regenerated (i.e., cleaned and brought back to its initial efficiency) without removing it from the filter press.

The foregoing objects are thus realized by the present invention which, briefly stated, comprises in the manufacture of viscose wherein the viscose is pressed through a filter medium to remove gel particles and solid impurities therefrom, the improvement which comprises passing the viscose to be filtered through a filter medium comprising a non-fulled woven base in which the warp and weft strands have an open weave to provide drainage passages from the front side to the back side, and nap producing layers of fiber material respectively at the front and back sides of said woven base attached thereto by fibers of said layers needled into and through said base from one to the other of said layers, all of said layers being composed of non-fulling, pliable, alkali-resistant, synthetic fiber material, the individual fibers of which are disposed partially at the respective sides of said woven base and partially in the drainage passages in a direction substantially perpendicular to said woven base, said woven base being composed of alkali-resistant, synthetic strand material.

In the preferred practice of this invention the plate and frame filter press conventionally used in the filtration of freshly prepared viscose is dressed with a plurality of filter cloths of the structure above described wherein both the woven base and the nap-producing layers consist of nylon. However in place of nylon, there may be employed any one or a combination of the alkali-resistant synthetic fibers known to the art such as, for example, "Dacron" polyester fiber, "Orlon" acrylic fiber, "Teflon" fluorocarbon resin, fiber glass, etc.

The following examples will serve to further illustrate the practice and advantages of this invention.

Example

Freshly prepared viscose was forced through a standard 36-inch plate and frame filter press dressed with felt sheets made from nylon substantially as described in Gates, U.S. Patent No. 2,588,228, and weighing 21 ounces per yard (X-12-26 paper maker's felt supplied by Drycor Felt Company). Filtration was continued until the filter became objectionably clogged at which point filtration was discontinued, and the filter was regenerated (reconditioned) by:

(1) Blowing air in the reverse direction through the filter press to force the viscose in the press back to a receiving tank.

(2) Backwashing the press with aqueous sodium hydroxide solution and recirculating the solution to remove alkali-soluble and other impurities.

(3) Forward washing with soft water to remove alkaline wash.

(4) Backblowing the press with compressed air to remove water and to "fluff" the felt.

The regenerated filter was then placed back in service. Approximately 13,000,000 pounds of viscose were filtered through the press with 71 regenerations and without replacement of the filter medium. Examination of the felt at the end of this time showed no signs of degradation. On the other hand, a set of 4 oz./sq. yd. cotton cloths (Barnhardt AAFB 4 oz./sq. yd. bonded cotton sheet), usually used, filtered only approximately 200,000 pounds of viscose before plugging, thus requiring cleaning and dressing with a new set of cotton cloths.

In a second run, another set of nylon felts of the same specifications filtered over 18,000,000 pounds of viscose with 82 regenerations. Inspections of the felts at the end of this time revealed no evidence of deterioration.

It is evident from the foregoing description that the filter medium of this invention provides an unusually economical expedient for the filtration of viscose in that it substantially avoids the necessity for frequent replacement of the filter medium with coincident savings in material, time and labor costs.

I claim:

1. In the process of manufacture of viscose wherein the viscose is passed through a filter medium to remove gel particles and solid impurities therefrom, the improvement which comprises passing the viscose to be filtered through a filter medium comprising a non-fulled woven base in which the warp and weft strands have an open weave to provide drainage passages from the front side to the back side, and nap producing layers of fiber material respectively at the front and back sides of said woven base attached thereto by fibers of said layers needled into and through said base from one to the other of said layers, all of said layers being composed of non-fulling, pliable, alkali-resistant synthetic fiber material, the individual fibers of which are disposed partially at the respective sides of said woven base and partially in the drainage passages in a direction substantially perpendicular to said woven base, said woven base being composed of alkali-resistant, synthetic strand material, whereby said filter medium is capable of regeneration in place for repeated service.

2. The process of claim 1 wherein said synthetic fiber material and said synthetic strand material are nylon.

References Cited in the file of this patent

UNITED STATES PATENTS 2,588,228    Gates _____ Mar. 4, 1952

OTHER REFERENCES

Du Pont: Multi-fiber Bulletin X–64, January 1957, pages 1 to 10, pages 4 and 8 are cited.

Materials and Methods, vol. 43, August 1955, pages 108–110.